(12) United States Patent
Goldsher et al.

(10) Patent No.: US 6,189,488 B1
(45) Date of Patent: Feb. 20, 2001

(54) WATERER FOR LIVESTOCK

(75) Inventors: Barry Goldsher, Avon; Tom Francis Soboleski, East Haddam, both of CT (US)

(73) Assignee: Engineering Services & Products Company, South Windsor, CT (US)

( * ) Notice: Under 35 U.S.C. 154(b), the term of this patent shall be extended for 0 days.

(21) Appl. No.: 09/047,048

(22) Filed: Mar. 24, 1998

(51) Int. Cl.$^7$ ........................................ A01K 7/00
(52) U.S. Cl. .................. 119/72; 248/65; 248/74.1; 248/230.2; 248/222.52; 138/106
(58) Field of Search .............................. 119/72, 72.5, 74, 119/75, 76, 81; 248/65, 73, 74.1, 230.1, 230.2, 316.2, 309.1, 219.4, 222.51, 222.52; 138/106, 107

(56) References Cited

U.S. PATENT DOCUMENTS

| | | | |
|---|---|---|---|
| 1,043,260 | * 11/1912 | Shover | 403/398 |
| 1,152,089 | * 8/1915 | Heide | 248/65 |
| 2,616,646 | * 11/1952 | Matthysse | 248/65 |
| 2,679,933 | * 6/1954 | Christophersen | 248/27.1 |
| 2,705,158 | * 3/1955 | Risley | 285/47 |
| 3,347,572 | * 10/1967 | Pfaff, Jr. et al. | 403/27 |
| 3,472,474 | * 10/1969 | Fountain et al. | 248/55 |
| 4,173,948 | * 11/1979 | Austin | 119/72 |
| 4,348,989 | * 9/1982 | Vik | 119/72 |
| 4,546,949 | * 10/1985 | Millett et al. | 248/514 |
| 5,603,286 | * 2/1997 | Gerbo | 119/72.5 |

* cited by examiner

Primary Examiner—Michael J. Carone
Assistant Examiner—James S. Bergin
(74) Attorney, Agent, or Firm—McCormick, Paulding & Huber LLP

(57) ABSTRACT

An assembly for adjusting the vertical height of a pipe in an animal waterer includes a bracket for securing the assembly to pen gating and a locking portion for locking the pipe at a particular height. The bracket includes a plurality of retaining loops having an arch portion with a pin protruding inwardly therefrom. The locking portion, having a locked position and an unlocked position, urges the pipe to engage the pins of the retaining loops in the locked position. In the unlocked position, the locking portion allows the pipe to move away from the pins so that the pipe may slide for height adjustment.

8 Claims, 4 Drawing Sheets

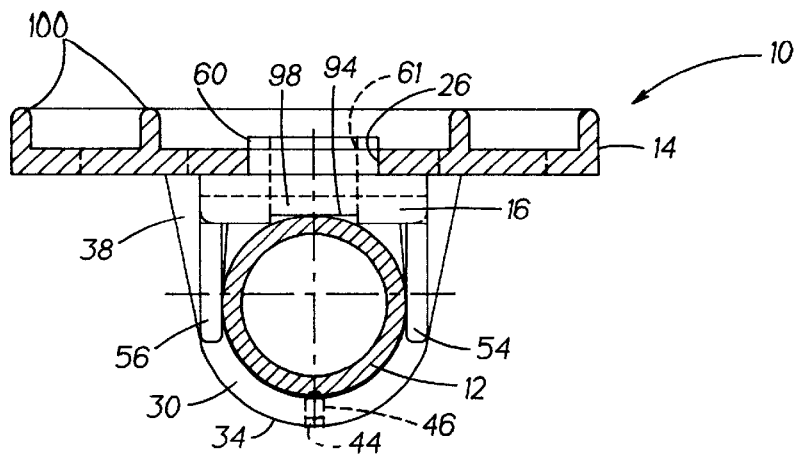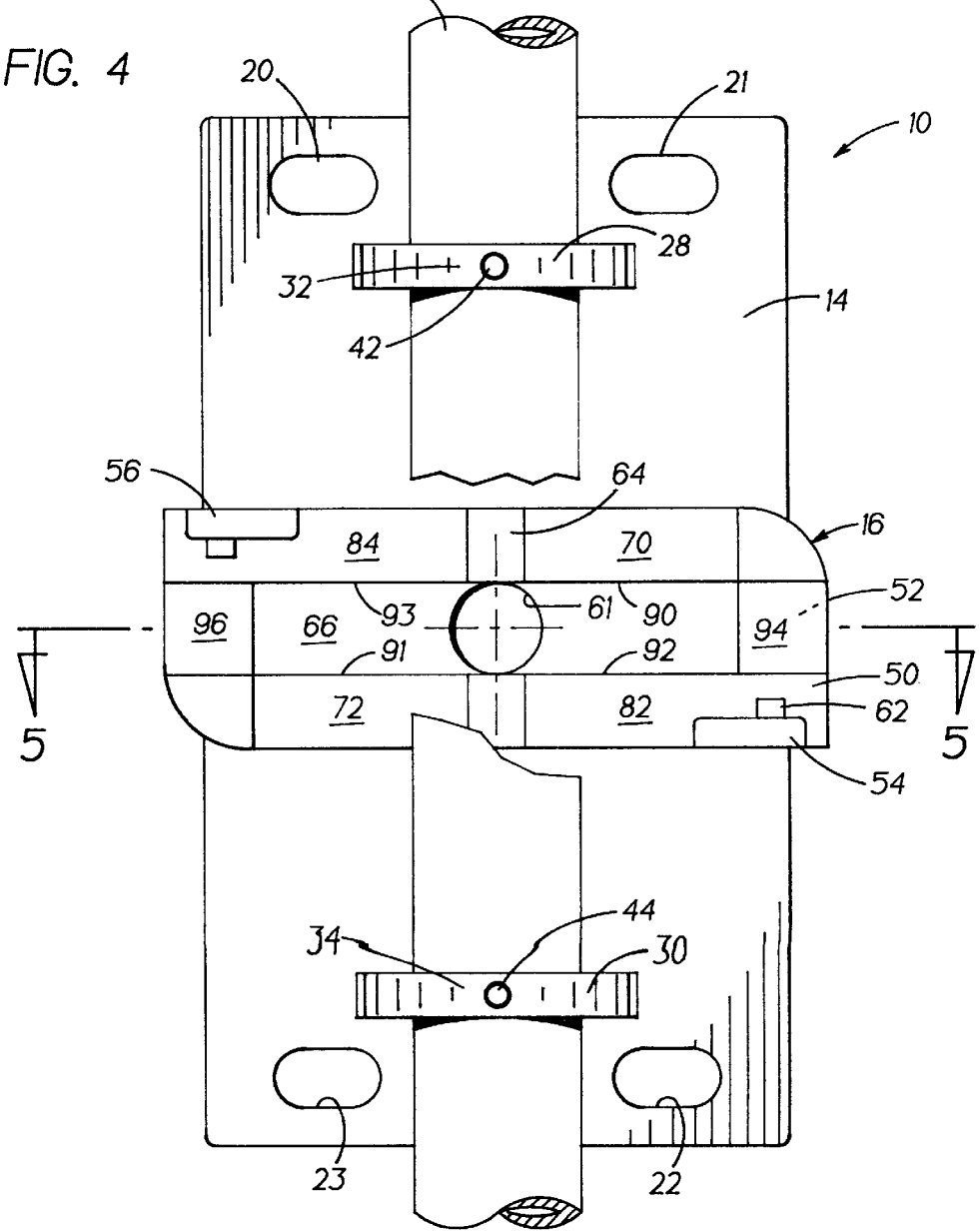

WATERER FOR LIVESTOCK

TECHNICAL FIELD

The present invention relates to waterers for livestock and, more particularly, to assemblies for adjusting the vertical height of a pipe therefor.

BACKGROUND OF THE INVENTION

Young livestock confined to gated pens typically obtain drinking water from animal waterers. The height of the animal waterer must be periodically adjusted to accommodate for the growing size of the animals. Conventional animal waterers include a metal pipe, with the top end of the pipe being attached to a water supply and the bottom end of the pipe terminating in a nipple. The nippled end is shaped to fit into the animals' mouths. The pipe is usually attached to the gate by a metal bracket. The metal bracket includes a spring located between two tabs, with each tab having an oval shaped opening for the pipe to pass through. The spring forces the tabs apart and into a position angled with respect to the pipe, resulting in a frictional engagement of the pipe and the tabs. As the tabs are squeezed together, the spring compresses and the tabs become substantially perpendicular to the pipe, allowing the pipe to move vertically through the oval shaped openings and to adjust for the appropriate height of animals. Releasing the tabs results again in frictional engagement of the pipe at the newly adjusted height.

One problem that arises with existing animal waterers is that metal corrodes. Corrosion necessitates frequent replacement of parts and of the entire assembly. Also, corrosion of both the pipe and the bracket makes moving the pipe vertically within the tabs difficult. Another problem with conventional animal waterers is that a certain force must be exerted to compress the spring. An even greater amount of force is required to compress the spring when the spring and the tabs corrode. Additionally, existing animal waterers are costly because these assemblies include many parts that require labor intensive assembly.

SUMMARY OF THE INVENTION

It is an object of the present invention to provide an assembly for adjusting the vertical height of a pipe in a waterer for livestock.

According to the present invention, an assembly for adjusting the vertical height of a pipe in an animal waterer includes a bracket that secures the assembly to a supporting structure and a locking portion that locks the pipe at a particular position. The bracket includes a plurality of retaining loops with arch portions for retaining the pipe in a vertical position and a central opening for rotatably engaging the locking portion. The locking portion has a locked position and an unlocked position. In the locked position, the locking portion urges the pipe against the arch portions of the retaining loops of the bracket, thereby securing the pipe in the vertical position. When the locking portion is rotated into the unlocked position, the force pushing the pipe toward the arch portions of the retaining loops is removed, thereby allowing the pipe to be moved vertically. After the desired vertical height of the pipe is reached, the locking portion is rotated into the locked position. The locking portion and the bracket of the present invention can be fabricated from plastic without jeopardizing functionality of the livestock waterer.

One feature of the present invention is an inward protrusion, such as a pin, passing through an opening formed in each of the arch portions. The pin engages the pipe when the locking portion forces the pipe against the arch portions, thereby further securing the pipe at a particular position and preventing spinning of the pipe.

One advantage of the present invention is that the pipe does not spin about its axis in the locked position when animals drink or bump into the waterer. Another advantage of the present invention is its superior functionality. The assembly does not corrode and continues to operate properly for long periods of time without the need for frequent replacement of parts or regular maintenance as a result of the corrosion. A further advantage of the present invention is its cost efficiency. First, the present invention reduces the number of parts, thereby translating into savings in manufacturing and assembly costs. Second, fabrication from plastic is less expensive than fabrication from metal, thereby reducing material cost. Moreover, since plastic weighs much less than metal, the animal waterer of the present invention is easier to handle and less expensive to ship. An additional advantage of the present invention is its ease of operation.

The foregoing and other advantages of the present invention become more apparent in light of the following detailed description of the exemplary embodiments thereof, as illustrated in the accompanying drawings.

BRIEF DESCRIPTION OF THE DRAWINGS

FIG. 3 is a cross-sectional, top plan view of the assembly of FIG. 1 in the locked position, taken along line 3—3;

FIG. 4 is a partially broken away, front elevational view of the assembly of FIG. 1 in an unlocked position;

DESCRIPTION OF THE PREFERRED EMBODIMENTS

Figure 1:
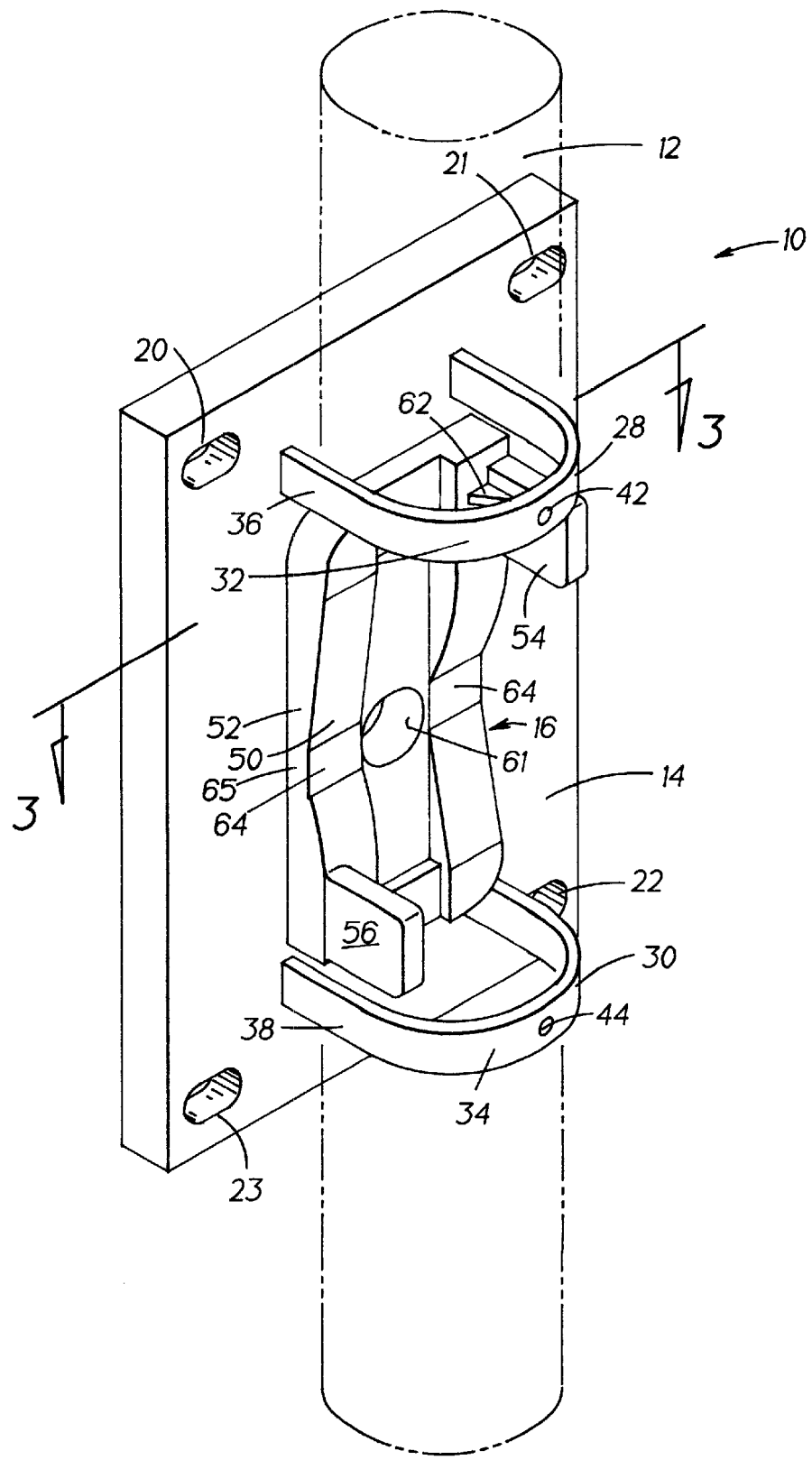
FIG. 1 is a perspective view of an assembly securing a pipe shown in phantom in a locked position, according to a present invention.
Figure 2:
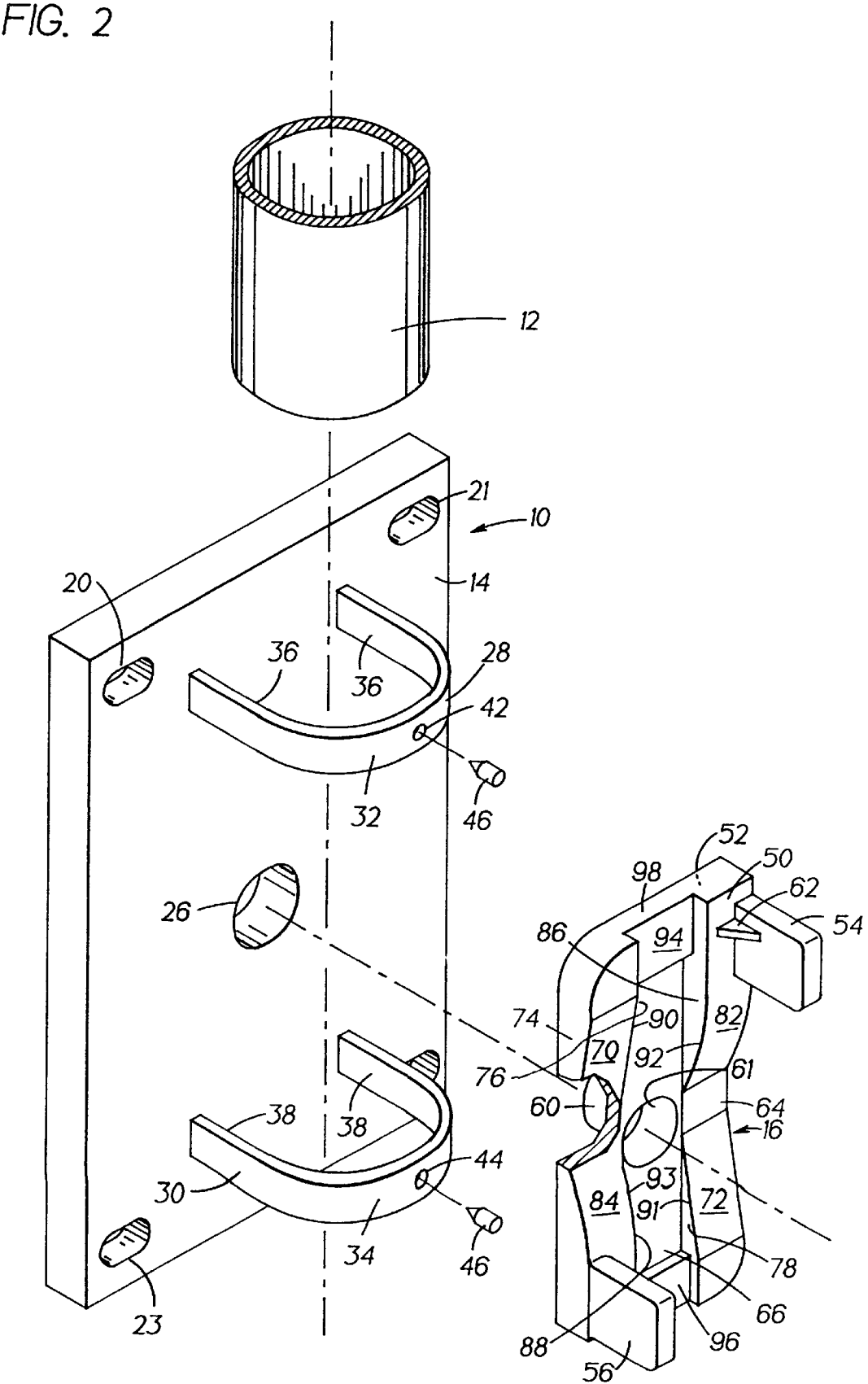
FIG. 2 is an exploded, perspective view of the assembly of FIG. 1.

Referring to FIG. 1, an assembly 10 for securing a pipe 12 in a vertical position in an animal waterer includes a bracket 14 and a locking portion 16, rotatably engaged with the bracket 14. The bracket 14 includes a plurality of openings 20–23, spaced apart to allow fasteners (not shown) to pass there through, and a bracket central aperture 26, disposed substantially in the center of the bracket 14 and having a bracket aperture diameter, as best seen in FIG. 2. The bracket 14 also includes a top retaining loop 28 and a bottom retaining loop 30, vertically aligned and spaced apart. Each retaining loop 28, 30 has an arch portion 32, 34 with an arch radius and elongated sides 36, 38, respectively. Each arch portion 32, 34 has an opening 42, 44 for a pin 46 to fit through and protrude inwardly.

Referring to FIG. 2, the locking portion 16, having a front 50 and a back 52, includes a pair of tabs 54, 56 protruding outwardly from the front 50 of the locking portion 16 and a cylindrical protrusion 60 extending rearwardly from the back 52 of the locking portion 16 and defining a bore 61. Each tab 54, 56 is supported by a brace 62. The cylindrical protrusion 60, having a diameter slightly smaller than the bracket aperture diameter, fits rotatably into the bracket central aperture 26.

The locking portion 16 also includes an unlocking groove 64 defining an unlocking thickness 65 and extending horizontally when the locking portion is in the locked position, as best seen in FIG. 1. The locking portion also includes a locking groove 66 extending vertically when the locking portion is in the locked position. The locking portion also has a first cam surface 70 and a second cam surface 72 disposed diagonally across the bore 61 of the protrusion 60. Each cam surface 70, 72 defines a cam thickness 74 gradually decreasing toward the unlocking groove 64 to form a smooth transition with the unlocking groove 64. Each cam surface 70, 72 forms a cam side wall 76, 78 with the locking groove 66. The locking portion 16 further includes a first ramp surface 82 and a second ramp surface 84, disposed diagonally from each other and opposite the first and second cam surfaces 70, 72, respectively. The first and second ramp surfaces 82, 84 form first and second ramp side walls 86, 88 with the locking groove 66. Each cam side wall 76, 78 and each ramp side wall 86, 88 have a retaining edge 90–93, respectively. The locking groove 66 also includes a first step 94 and a second step 96, formed on opposite ends of the locking groove 66. The first and second steps 94, 96 define locking thicknesses 98 for the locking portion 16 of the assembly 10.

Depending on the specific configuration of the animal pens, the bracket 14 can be mounted either to a wall with a plurality of fasteners passing through the openings 20–23 in the bracket 14 and attaching into the wall directly, or if the waterer is secured to the pen gate, a second bracket can be mounted to the back of the bracket 14 supporting the pipe 12 with fasteners passing through both brackets, thus securing the entire assembly onto the pen gating. Alternatively, two brackets 14 each supporting a pipe 12 can be placed back to back and attached to the pen gating such that a pipe is available for drinking on each side of the pen gate. In the locked position, the locking portion 16 is in a vertical position, as shown in FIGS. 1 and 3. In the locked position, the first and second steps 94, 96 of the locking portion 16 force the pipe 12 against the arch portions 32, 34 of the retaining loops 28, 30, since the locking thicknesses 98 of the steps 94, 96 take up the space between the pipe 12 and the bracket 14. The retaining edges 90–93 come into contact with the pipe 12 and also provide support. As the pipe 12 is forced against the arch portions 32, 34 of the retaining loops 28, 30, the inwardly protruding pins 46 press into the pipe 12. Such interference between the pipe 12 and the pins 46 provides an additional insurance that the pipe will be prevented from slipping vertically and from spinning about its own axis.

Figure 6:
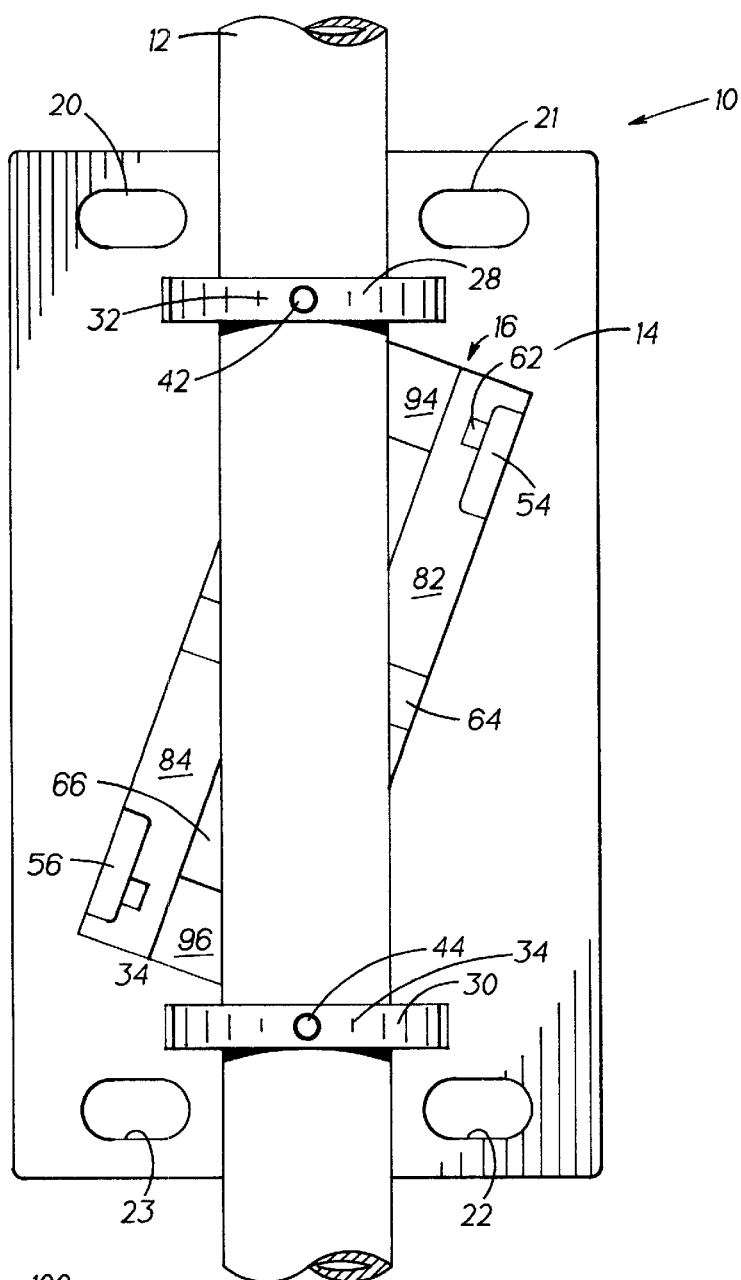
FIG. 6 is a front elevational view of the assembly of FIG. 5 in an intermediate position.
Figure 5:
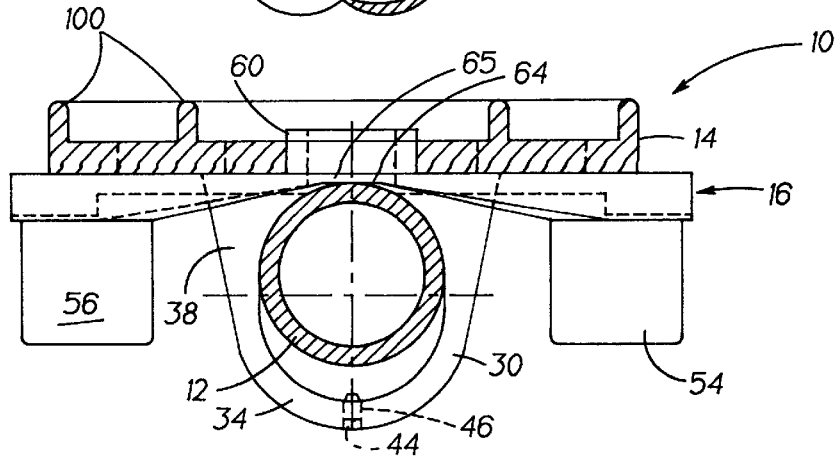
FIG. 5 is a cross-sectional, top plan view of the assembly of FIG. 4 in the unlocked position, taken along line 5—5 shown in FIG. 4.

When the height of the pipe 12 needs adjustment, the locking portion 16 is rotated clockwise into an unlocked position, as shown in FIGS. 4 and 5. The tabs 54, 56 are used to rotate the locking portion 16 with a twisting motion. With a certain amount of initial twisting force applied to the tabs 54, 56, the pipe 12 clears the retaining edges 90, 91 of the locking portion 16. As the locking portion further transitions from the locked position into the unlocked position, the cam surfaces 70, 72 ensure a smooth transition, as shown in FIG. 6. The protruding cylinder 60 of the locking portion 16 rotates within the bracket central aperture 26.

In the unlocked position, the locking portion 16 is in the horizontal position with the unlocking groove 64 being disposed between the bracket 14 and the pipe 12, as best seen in FIGS. 4 and 5. Since the unlocking thickness 65 of the unlocking groove 64 is smaller than the locking thickness 98 of the steps 94, 96, the force urging the pipe 12 against the arch portions 32, 34 is removed, allowing the pipe 12 to move away from the arch portions 32, 34 of the retaining loops 28, 30 and toward the bracket 14. As the interface between the pipe 12 and the pins 46 is relaxed, the pipe can be moved vertically within the retaining loops 28, 30.

Once the appropriate vertical height of the pipe 12 is achieved, the locking portion 16 is twisted into the vertical locked position. As the twisting force is applied to the tabs 54, 56 of the locking portion 16, the cam surfaces 70, 72 smoothly engage the pipe 12 and force the pipe against the arch portions 32, 34 of the retaining loops 28, 30. Once the locking portion 16 is rotated into the vertical locked position, the pipe is pressed against the arch portions 32, 34 of the retaining loops 28, 30 and fits into the locking groove 66 to be cradled by the retaining edges 90–93. As the pipe 12 is pressed against the arch portions 32, 34 of the retaining loops 28, 30, the pins 46 engage the pipe 12 and ensure that the pipe does not spin within the retaining loops 28, 30 and does not slip vertically.

The pipe 12, the bracket 14 and the locking portion 16 of the present invention are fabricated from plastic. The plastic assembly of the present invention has many advantages over prior art. One advantage of the present invention is that the assembly does not corrode. The noncorroding quality of the present invention ensures long service life without a need for frequent part replacement or for regular maintenance. Another major advantage of the present invention is cost efficiency. First, the present invention reduces the number of parts, thereby translating into savings in manufacturing and assembly costs. Second, fabrication from plastic is easier to handle and less expensive than fabrication from metal, thereby reducing material cost. Moreover, since plastic weighs much less than metal, the animal waterer of the present invention is less expensive to ship to its destination. An additional advantage of the present invention is the ease of operating the assembly. The twisting motion of the locking portion to unlock or lock the pipe in the vertical direction does not require a great deal of force.

Although in the best mode embodiment of the present invention the bracket and the locking portion are fabricated from plastic, the strength of the assembly 10 is not compromised. To ensure durability of the assembly 10, the bracket 14 may include a plurality of ribs 100 extending vertically, as best seen in FIGS. 3 and 5. Although the best mode of the present invention describes pins 46 protruding through the arch portions of the retaining loops, other inward protrusions such as a screw or any other type of sharp object would be acceptable. The pins 46 or other inward protrusions are preferably fabricated from metal to facilitate engagement with the pipe.

While the present invention has been illustrated and described with respect to a particular embodiment thereof, it should be appreciated by those of ordinary skill in the art, that various modifications to this invention may be made without departing from the spirit and scope of the present invention. For example, edges 90–93 may set the pipe in the locked position instead of the locking groove 64.

We claim:

1. An animal waterer assembly having a pipe secured in a vertical position, said animal waterer assembly comprising:

a bracket for attaching said assembly to a structure;

a plurality of retaining loops extending from said bracket, each of said plurality of retaining loops being aligned and spaced apart with respect to each other, each of said plurality of retaining loops having an arch portion; and a locking portion disposed between said bracket and said pipe, said locking portion having a locked position and an unlocked position, in said locked position said locking portion urging said pipe toward said arch portions of said retaining loops of said bracket to secure said pipe in a set position against said arch portions, in said unlocked position said locking portion releasing said pipe from said set position for adjustment of said pipe, each of said arch portions of said retaining loops further including an inward protrusion to engage said pipe in said locked position, said inward protrusion being a pin.

2. An animal waterer assembly having a pipe secured in a vertical position, said animal waterer assembly comprising:

a bracket for attaching said assembly to a structure;

a plurality of retaining loops extending from said bracket, each of said plurality of retaining loops being aligned and spaced apart with respect to each other, each of said plurality of retaining loops having an arch portion; and a locking portion disposed between said bracket and said pipe, said locking portion having a locked position and an unlocked position, in said locked position said locking portion urging said pipe toward said arch portions of said retaining loops of said bracket to secure said pipe in a set position against said arch portions, in said unlocked position said locking portion releasing said pipe from said set position for adjustment of said pipe, said assembly being fabricated from plastic.

3. The animal waterer assembly according to claim 2 wherein each of said arch portions of said retaining loops further includes an inward protrusion to engage said pipe in said locked position.

4. The animal waterer assembly according to claim 2 wherein said bracket has a central aperture for rotatably engaging said locking portion.

5. The animal waterer assembly according to claim 2 wherein said locking portion has a plurality of tabs protruding outwardly therefrom for rotating said locking portion between said locked position and said unlocked position.

6. The animal waterer assembly according to claim 2 wherein said locking portion is rotatable on said bracket between said locked position and said unlocked position.

7. An animal waterer assembly having a pipe secured in a vertical position, said animal waterer assembly comprising:

a bracket for attaching said assembly to a structure;

a plurality of retaining loops extending from said bracket, each of said plurality of retaining loops being aligned and spaced apart with respect to each other, each of said plurality of retaining loops having an arch portion; and a locking portion disposed between said bracket and said pipe, said locking portion having a locked position and an unlocked position, in said locked position said locking portion urging said pipe toward said arch portions of said retaining loops of said bracket to secure said pipe in a set position against said arch portions, in said unlocked position said locking portion releasing said pipe from said set position for adjustment of said pipe, said locking portion having a locking thickness and an unlocking thickness with said locking thickness being greater than said unlocking thickness, in said locked position of said locking portion said locking thickness urging said pipe toward said arch portions of said retaining loops to engage said pipe with inward protrusions extending inward from said arch portions, in said unlocked position said unlocking thickness allowing said pipe to disengage from said inward protrusions and to be moved vertically.

8. An animal waterer assembly having a pipe secured in a vertical position, said animal waterer assembly comprising:

a bracket for attaching said assembly to a structure;

a plurality of retaining loops extending from said bracket, each of said plurality of retaining loops being aligned and spaced apart with respect to each other, each of said plurality of retaining loops having an arch portion; and a locking portion disposed between said bracket and said pipe, said locking portion having a locked position and an unlocked position, in said locked position said locking portion urging said pipe toward said arch portions of said retaining loops of said bracket to secure said pipe in a set position against said arch portions, in said unlocked position said locking portion releasing said pipe from said set position for adjustment of said pipe, said locking portion having a first cam surface and a second cam surface for urging said pipe toward and releasing said pipe from said arch portions.

* * * * *